United States Patent [19]

Tailor et al.

[11] Patent Number: 4,676,817
[45] Date of Patent: Jun. 30, 1987

[54] METHOD AND APPARATUS FOR FORMING A HERMETIC SEAL BETWEEN GLASS AND METAL

[75] Inventors: Ramesh C. Tailor, Bedford Hts.; Bradley K. Utts, South Russell, both of Ohio

[73] Assignee: Harshaw/Filtrol Partnership, Cleveland, Ohio

[21] Appl. No.: 899,831

[22] Filed: Aug. 25, 1986

[51] Int. Cl.$^4$ ............................................. C03C 27/02
[52] U.S. Cl. ........................................ 65/43; 65/59.21; 65/59.22; 65/59.24; 65/59.28; 65/59.4; 65/59.5; 65/140; 65/154
[58] Field of Search ................... 65/43, 50, 51, 59.4, 65/59.5, 59.22, 59.24, 59.28, 59.34, 140, 154 65/59.21

[56] References Cited

U.S. PATENT DOCUMENTS

| | | | |
|---|---|---|---|
| 3,225,132 | 12/1965 | Baas et al. | 65/43 X |
| 3,297,392 | 1/1967 | Ballmer | 65/43 X |
| 3,410,674 | 11/1968 | Martin | 65/59.34 |
| 3,464,805 | 9/1969 | Landron, Jr. | 65/59.22 |
| 3,467,560 | 9/1969 | Brown | 65/43 X |
| 3,672,858 | 6/1972 | Berg | 65/43 |
| 4,162,826 | 7/1979 | Van Der Beck et al. | 65/43 X |
| 4,617,044 | 10/1986 | Kramer et al. | 65/59.22 |

FOREIGN PATENT DOCUMENTS

| | | | |
|---|---|---|---|
| 2450928 | 10/1973 | Fed. Rep. of Germany | 65/43 |
| 561682 | 5/1944 | United Kingdom | 65/43 |
| 837952 | 6/1981 | U.S.S.R. | 65/154 |

*Primary Examiner*—Arthur Kellogg
*Attorney, Agent, or Firm*—Harshaw/Filtrol Partnership

[57] ABSTRACT

A rugged scintillation detector uses a hermetically sealed window assembly welded or otherwise bonded to the detector housing. A method and apparatus useful in forming a reproducible hermetic seal between the glass and an annular metal retaining ring is described. The glass and ring are chosen so that the ring diameter is slightly larger than that of the glass at room temperature. A thin layer of frit at the interface ensures a very tight mechanical seal, and a surface layer of chromium oxide on the ring ensures a secure chemical bond. The assembly device uses pressure and counterpressure to uniformly and reproducibly assemble the glass window into the retainer ring at elevated temperatures.

18 Claims, 1 Drawing Figure

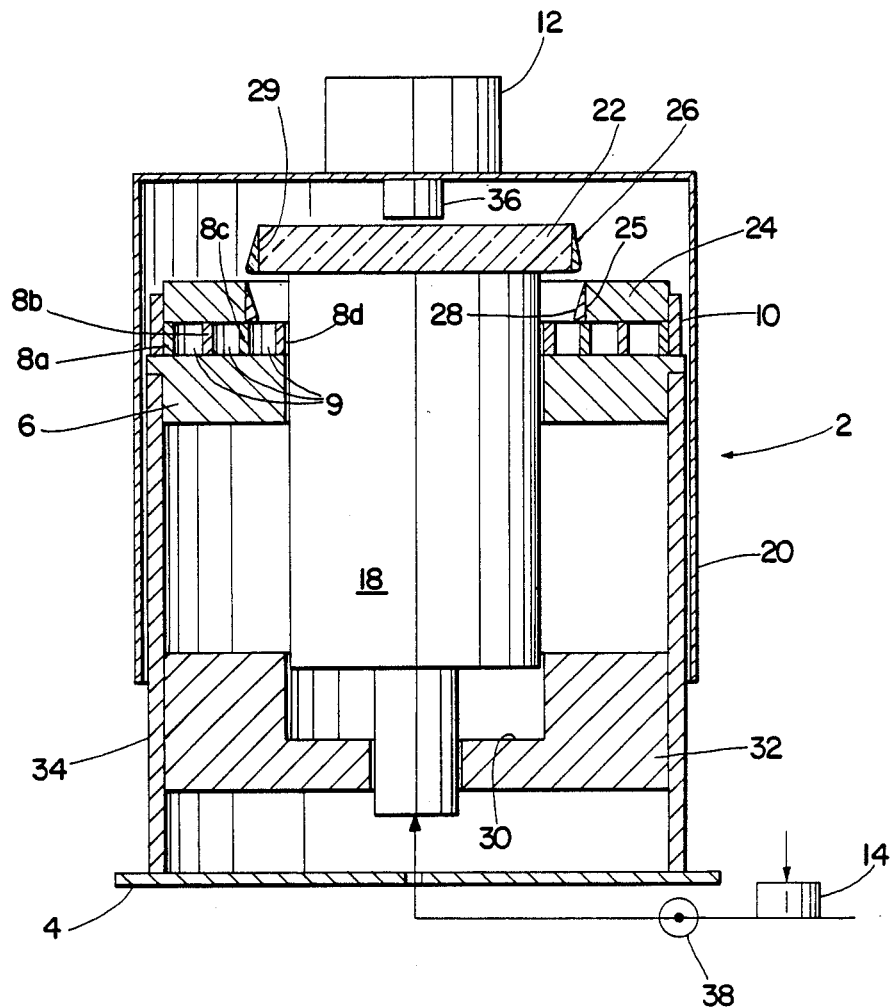

METHOD AND APPARATUS FOR FORMING A HERMETIC SEAL BETWEEN GLASS AND METAL

BACKGROUND OF THE INVENTION

Prior efforts at producing a rugged scintillation detector for well hole logging have met with marginal success, particularly when using a scintillation crystal that forms hydrates and becomes unusable or unreliable when exposed to moisture. The typical construction of a scintillation detector using a hygroscopic crystal such as NaI(Tl) involves the use of a hermetically sealed housing to hold the crystal, said housing having a window at one end. The window in turn is optically coupled to a photomultiplier tube capable of recording the occurrence of scintillation flashes or events occurring within the crystal. Maintaining a hermetic seal between the window and the housing has been a recurring problem, particularly where the detector is subjected to a harsh environment. Even though various remedies have been proposed in the past, none of them have been entirely successful for detectors useful in severe applications such as well hole logging.

U.S. Pat. Nos. 4,004,151 and 4,360,733 rely on an epoxy resin and a tapered window inside a retaining ring or housing to securely hold the window in place. For the most part, epoxy resins cannot withstand repeated thermal cycling and the assemblies are susceptible to failure within a relatively short period of time.

Another approach to this problem has been to use a Kovar metal ring which is bonded to glass to form a tight seal. However, the choice of glass is very limited to one specific formulation which has expansion characteristics that precisely match those of the Kovar metal. This severely restricts the selection and optimization of glass having optical properties that may be considered to be desirable for a given application.

BRIEF DESCRIPTION OF THE INVENTION

The present invention covers a method and apparatus for achieving a reproducible hermetic seal between a glass window and a metal retainer ring. The ring is adapted to be welded to the detector housing for a scintillation crystal. The method involves selecting a metal ring having a coefficient of thermal expansion which is between 0.5 and 2.5 ppm (parts per million)/°C. greater than the coefficient of thermal expansion of the glass window in the range of 20° to 500° C., machining the ring so that the inner diameter is between about 0.005" to 0.015" larger than the diameter of the glass at ambient temperatures, uniformly and completely applying a glass frit to the mating edges of the annular ring and the glass, firing the frit, heating the window and assembly to a temperature at which the frit melts to permit the glass to be assembled into the ring, and maintaining stabilization of the window during assembly by applying pressure of between 1 and 3 psi on the window and a counter pressure of between 0.2 and 0.8 psi.

This procedure preferably is achieved by the use of a sealing fixture which includes means for positioning the window above and in axial alignment with the metal ring, means to heat the ring sufficiently to melt the sealing frit and means to bias the window into position within the ring, the biasing means of including means to exert a downward pressure on the window, and means to apply a smaller pressure to the window in the upward direction to prevent mis-alignment of the window as it is pressed into the ring.

BRIEF DESCRIPTION OF THE DRAWINGS

The FIGURE represents a cross-sectional elevated view, partially in cross section of the sealing fixture of the present invention.

DESCRIPTION OF THE PREFERRED EMBODIMENT

The method of forming an effective glass-to-metal assembly according to the present invention comprises the steps of prewetting the glass and the metal ring with a sealing frit, precisely aligning and assembling the glass into the ring while the frit is molten, cooling the assembly, and lapping and polishing both faces of the ring. The polished assembly is then welded to one end of the detector housing.

In more detail, a stainless steel ring is machined to have an outer diameter corresponding to that of the detector housing, an inner diameter between 0.005" to 0.015" larger than the diameter of the glass window and a width at least equal to the width of the glass window. The ring is machined from 446 stainless steel, a non-hardenable chromium steel having very high corrosion and heat resistance. It contains 23 to 27% chromium, 1% silicon, a maximum of 1.5% Mn with 0.25% or less of nitrogen, carbon, phosphorus and sulfur. The ring is degreased and is then heated in an air atmosphere to 500° C. to oxidize the surface, forming the mixed oxides of chromium and iron, which serve to enhance the bond with the glass.

The material which is selected for use as an optical window should be highly transparent in the optical range in which the crystal scintillates. A suitable glass for use with a NaI(Tl) crystal is referred to as UBK-7 and is manufactured and sold by Thermal American Fused Quartz Company. This glass is characterized by transmittance of at least 0.97 in the range of 365 nm to about 1750 nm and a refractive index of at least 1.5 in the same range. It softens at 716° C. The glass is formed into the shape of a flat circular disc having a uniform thickness between 0.20" to 0.40".

The diameter of the glass disc is approximately 0.005" to 0.015" smaller than the inner diameter of the ring at ambient temperatures. The glass disc is cleaned well in acetone and is then degreased with trichloroethylene. A thick slurry of frit is prepared by thoroughly mixing 5-6 parts of a glass frit with 1 part of a vehicle such as distilled water. A suitable frit is Corning 7570 having a particle size distribution of 100 to 325 mesh, and containing a high percentage of lead oxide. The softening point of the frit is 440° C. and its coefficient of thermal expansion is 8.4 ppm/°C. in the range of 25°-300° C. The slurry of frit is applied uniformly to the inner surface of the metal ring following which the ring, while laying flat, is thermally cycled between room temperature and a temperature of about 500° C. to ensure wetting of the entire inner surface of the ring. The fired frit results in tapering of the ring ID by about 2.5 mils.

In like manner the frit is applied to the edge of the glass disc followed by thermal cycling, while laying flat, to ensure uniform and complete wetting of the edge of the glass. The fired frit results in the effective tapering of the glass (window) diameter by about 2-5 mils. The frit is preferably applied by a medicine dropper over a lathe machine although dipping, spraying, silk screening and other methods of application may be used. Because of the added thickness of the solidified frit layers, the effective diameter of the glass disc is greater than the inner diameter of the ring at room temperature, therby preventing assembly of the disc into the ring.

The frit preferably is applied to the ring by placing the ring in a chuck and slowly rotating the chuck at a speed of 20-40 rpm. With the ring rotating, a few drops of slurry are poured onto the inner surface of the ring following which the slurry is dried. The ring is then removed from the chuck and is heated in an oven as aforesaid. In like manner, the window is positioned between a pair of glass holding studs and the edge is coated with slurry followed by drying and heating.

The sealing cycle for the window and the ring involves heating them at the rate of 8° C./min to 500° C. in air and holding at that temperature for 30-60 minutes to melt the frit and assemble the window into the ring and cooling the assembly at the rate of 1° C./minute. The glass and ring are carefully assembled as the sealing frit is molten by very precisely pushing the window into the ring, while maintaining stabilization of the window and ring at all times. This ensures uniform and even bonding of the ring to the window. A sealing fixture capable of maintaining such stabilization during assembly is shown in the drawing.

The thermal expansion coefficients of the glass, the retainer ring and the frit are selected to be between about 1.0 and 2.5 ppm/°C. of one another in the temperature range of 20° to 500° C. with the coefficient of the metal retainer ring being slightly greater than that of the glass to ensure a compression fit when the assembly is cooled.

The sealing fixture utilizes a weight and counterweight to permit the glass window to be slowly and evenly inserted into the ring as the frit is melted. The entire fixture is adapted to be placed in a furnace (not shown) which is heated to a temperature at which the frit becomes molten. Typically, this temperature is at least 470° C.

Referring specifically to the drawing, the sealing fixture 2 is mounted on a levelled platform 4 and comprises a ring support 6 having a plurality of vertically extending concentric circular ribs 8a, 8b, 8c and 8d. A retainer ring 24 rests on the ribs and is restrained against shifting by a positioning ring 10. At least one of the ribs 8d has a diameter which is less than the inner diameter 25 of the ring 24. As previously mentioned, the ring I.D. and the glass (window) diameter have a taper of about 2-5 mils due to the fired frit coatings. The ring is placed on the ribs so that the larger inner diameter is at the top. The inner surface of the ring is coated with a thin layer of frit 28. A glass window 22 in the shape of a cylindrical disc rest on a piston 18 in axial alignment with the retainer ring. The circumferential edge 29 of the window is coated with a layer of frit 26.

The piston 18 slides vertically within the ring support 6 between the pre-assembly postion as shown, ad a lower position, limited by the shoulder 30 of stop 32. The piston stop and ring support are mounted in a frame 34 which rests on and preferably is secured to platform 4. A thermal cap 20 slip fits over the sealing fixture and is adapted by means of stud 36 and weight 12 to exert a downward pressure of between about ½ and 3 pounds per square inch on the glass window. The downward pressure is opposed by a counterweight 14 which works through pivot 38 to exert an upward force on the piston 18 of about 0.1 to 1 pound. The cap serves to retard heat transfer during thermal cycling, thereby serving to reduce thermal shock to the window.

While the glass window and ring are at room temperature, the glass will rest on the ring, but, because of the solid layers of frit 25 and 26 on the ring and window respectively, the effective diameter of the window is larger than the effective inner diameter of the ring and the window is not forced into the ring. When the entire assembly is placed in an oven which is heated to a temperature at which the frit melts, the glass is gently pressed into the ring as the downward presure of the weight 12 pushes the piston down. The counter pressure offers enough resistance to physically stabilize the glass and to keep the glass in contact with the top planar surface of the piston, thereby preventing the glass from getting tilted or mis-aligned while entering the retainer ring. The grooves 9 between the circular ribs 8a-d provide more than sufficient space to prevent the possibility of excess molten frit sticking to the sealing fixture during assembly. The glass window slides into the ring until one or more of the ribs 8a-d of the ring support prevent further downward movement of the window.

By using a plurality of ribs and different positioning rings of varying diameters, the sealing fixture is capable of handling windows of different diameters for use on a variety of detector assemblies.

The window assembly is slowly cooled at a rate(~1° C./min) that reduces the buildup of thermal stresses within the window. As previously mentioned, the coefficient of thermal expansion of the metal ring preferably is 1.0 to 2.5 ppm/°C. greater than that of the glass, thereby causing the metal to contract more than the glass during cooling to form a compression seal with the glass. In addition, a strong chemical bond is formed between the glass and the oxide layer (believed to be due to the presence of $Cr_2O_3$ and iron oxide in the oxide layer).

The glass-sealed ring after being welded to the appropriate pipe is leak checked by a helium leak checker to a sensitivity of $10^{-10}$ atm-cc/sec.

Following the formation of the hermetic seal between the glass and the metal, the surfaces of the window and ring are ground to remove excess frit. They are then lapped so that the surfaces of the metal and glass are flush with one another and the glass is polished for maximum optical clarity.

The window assembly is joined to the detector housing by appropriate means such as welding. The preferred method of welding is electron beam welding although other methods of welding may be used provided they do not produce excessive heat build-up which can cause thermal stresses within the glass, possibly leading to its fracture. Electron-beam welding can be achieved using an operating power as low as 0.1 watt. The retaining ring can also be designed with one or more thermal barriers such as grooves or can be held in a heat dissipating chuck or holder during welding to minimize the amount of generated heat that reaches the window. The housing typically is composed of 304 stainless steel.

Appropriate means can be used to check the integrity of the glass to metal seal after assembly. For example, the ring is welded to the housing after which it is checked for leaks using a helium leak checker. In addition, after the detector is fully assembled, the adequacy of the seal can be demonstrated by immersing fully assembled detector in silicon oil in a Bell jar and evacuating the jar to remove all traces of air. Any lack of integrity of the glass-to-metal seal or housing welds will manifest itself by visual detection of a steady stream of bubbles coming from the assembly at the location of the leak.

A number of variations can be made in the design and construction of this device without departing from the inventive features described herein. For example the ring support and positioning ring may be replaced with an adjustable chuck. The design and shape of the piston support for the glass window may be varied, without departing from the basic assembly technique which utilizes a pressure-counterpressure means of preserving alignment of the window and the retainer ring while the window is being fitted into the ring. Another alternative is to apply the pressure/counterpressure against the ring to move it into alignment with the window restraining the window against movement.

Although the invention has been described in connection with the assembly of hermetically sealed housings for radiation detectors, the use of an air-tight seal between glass and metal in many other applications is manifest.

We claim:

1. The method of bonding an optical window to a metal retaining ring to form a hermetic seal comprising the steps of
    (a) choosing a metal for the retaining rin and an optical material for the window whereby the coefficient of thermal expansion of the metal is between about 1.0 ppm/°C. and about 2.5 ppm/°C. greater than that of the optical material through the temperature range of 20° C. to 500° C.
    (b) dimensioning the retaining ring and optical window so that the inner dimension of the ring and optical window so that the inner dimension of the ring is between about 7 mils and about 15 mils larger than that of the window at ambient temperature
    (c) applying a layer of frit to at least one of the surfaces to be hermetically sealed, said layer of frit being sufficiently thick so that the effective diameter of the window and the layer of frit is slightly greater than that of the ring
    (d) heating the window and ring to a temperature that is sufficiently high to melt the frit
    (e) pressing the window into the ring using a pressure of between about 0.5 and about 3 pounds per square inch while maintaining a lower stabilizing counterpressure of between about 0.1 and about 1 pound per square inch
    (f) slowly cooling the window/ring assembly to ambient temperature.

2. The method of claim 1 wherein a layer of frit is applied to the surface of the ring and the surface of the window to be bonded.

3. The method of claim 2 wherein the frit is applied to each surface as a slurry, and is then dried and is heated to a temperature at which the surfaces to be bonded are completely wetted.

4. The method of claim 3 wherein the window and ring are heated to a temperature of at least 470° C. during assembly.

5. The method of claim 4 wherein the metal retaining ring consists of stainless steel containing between 23 and 27% chromium and the ring is preheated to a temperature and for a period of time in air to form a layer of oxides including chromium oxide on the surface of the ring.

6. The method of claim 4 wherein the window assembly is cooled after assembly, after which the assembly is ground and lapped and the window is polished.

7. A device for assembling a circular optical window into an annular metal ring to form a compression fit comprising
    (a) means for positioning the window vertically above and in axial alignment with the metal ring,
    (b) means for biasing the window into position within the ring, said biasing means including means for exerting a downward pressure against the window to press the same into the ring and means for exerting an opposite and smaller upward counterpressure against the window to prevent misalignment during assembly.

8. The device of claim 7 wherein the biasing means comprises a weight of sufficient magnitude to exert a downward pressure of between about 0.5 and about 3 psi.

9. The device of claim 8 wherein the means for exerting a counterpressure comprises a pivoted counterweight capable of exerting an upward pressure of between about 0.1 and about 1 psi.

10. The device of claim 9 including means for heating the window and ring during assembly.

11. A device for use in assembling a glass window into an annular retainer ring comprising
    (a) an annular support for supporting and positioning the retainer ring in a horizontal position,
    (b) a piston vertically movable within the annular support and having a top surface that conforms with one surface of the window, said piston adapted to support the window vertically above and axially aligned with the retainer ring,
    (c) means for applying a downward pressure on the window,
    (d) means for exerting an upward pressure on the window through the piston, said upward pressure being smaller than the downward pressure, and
    (e) means to heat the ring and the window.

12. The device according to claim 11 wherein the retainer ring and the glass window utilize a layer of frit to insure the formation of a hermetic seal between the ring and the glass, and the ring support contains a plurality of concentric grooves in the support surface to collect molten frit flowing from the interface as the window slips into the retainer ring.

13. The device according to claim 12 wherein the means for applying upward pressure on the piston comprises a pivoted counterweight.

14. The device according to claim 13 wherein the pivoted counterweight causes the piston to exert an upward pressure of between about 0.1 and about 1 psi against the glass window.

15. The device according to claim 14 wherein the piston has a diameter which is smaller than the window diameter and moves vertically within the annular support for the ring.

16. The device according to claim 15 wherein the inner diameter of the annular support is less than that of the retainer ring.

17. The device according to claim 16 wherein the portion of the annular support axially inside of the retainer ring serves as a stop for the window to prevent further movement when the window is fully positioned within the retainer ring.

18. The device according to claim 17 wherein the means for applying downward pressure comprises a thermal cap slidably fitting around the ring and window and a weight pressing downwardly against the window.

* * * * *